(12) United States Patent
Hussey

(10) Patent No.: US 7,827,522 B2
(45) Date of Patent: Nov. 2, 2010

(54) COMPUTER METHOD AND APPARATUS FOR IMPLEMENTING REDEFINITION OF MODEL FEATURES

(75) Inventor: Kenneth Earle Hussey, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1304 days.

(21) Appl. No.: 10/975,779

(22) Filed: Oct. 28, 2004

(65) Prior Publication Data

US 2006/0101379 A1    May 11, 2006

(51) Int. Cl.
*G06F 9/44* (2006.01)
(52) U.S. Cl. .................... 717/105; 717/110; 717/114
(58) Field of Classification Search ......... 717/104–109, 717/144–119, 171
See application file for complete search history.

(56) References Cited

U.S. PATENT DOCUMENTS

| | | | |
|---|---|---|---|
| 5,987,247 A * | 11/1999 | Lau ............................. 717/100 |
| 6,337,696 B1 * | 1/2002 | Lindhorst et al. ........... 715/763 |
| 6,356,955 B1 | 3/2002 | Hollberg et al. |
| 6,611,955 B1 | 8/2003 | Logean et al. |
| 7,039,908 B2 | 5/2006 | Steensgaard |
| 7,069,537 B2 | 6/2006 | Lazarov |
| 7,219,328 B2 | 5/2007 | Schloegel et al. |
| 7,293,254 B2 | 11/2007 | Bloesch et al. |
| 7,404,176 B2 | 7/2008 | Reeder et al. |
| 2002/0104068 A1 | 8/2002 | Barrett et al. |
| 2002/0133812 A1 | 9/2002 | Little et al. |
| 2002/0147763 A1 | 10/2002 | Lee et al. |
| 2004/0015843 A1* | 1/2004 | Quan, Jr. ..................... 717/110 |
| 2004/0139095 A1 | 7/2004 | Trastour et al. |
| 2005/0071805 A1 | 3/2005 | Lauterbach et al. |
| 2005/0076328 A1 | 4/2005 | Berenbach et al. |
| 2005/0160401 A1 | 7/2005 | Russo et al. |
| 2005/0188353 A1 | 8/2005 | Hasson et al. |
| 2005/0261923 A1 | 11/2005 | Brown et al. |
| 2005/0268281 A1 | 12/2005 | Letkeman et al. |
| 2006/0064667 A1 | 3/2006 | de Freitas |
| 2006/0101376 A1 | 5/2006 | Gutz et al. |

FOREIGN PATENT DOCUMENTS

JP      2001075817       3/2001

OTHER PUBLICATIONS

Buttner and Gogolla "On Generalization and Overrriding in UML 2.0", Oct. 12, 2004, OCL and Model Driven Engineering, UML 2004 Conference Workshop, pp. 1-15.*

Akehurst, Howells and Maier "Implementing associations: UML 2.o to Java 5", Mar. 2007, Software adn Systems Modeling, vol. 6, No. 1. pp. 3-35.*

(Continued)

*Primary Examiner*—Jason D Mitchell
(74) *Attorney, Agent, or Firm*—Hamilton, Brook, Smith & Reynolds, P.C.

(57) ABSTRACT

Computer method and apparatus implements redefinition of features in a programming model. The invention method includes (i) providing a model element having a feature with a redefinition such that the feature is a redefined feature; (ii) storing indications of the redefinition; and (iii) interpreting the stored indications and generating therefrom a model that implements the redefined feature. Redefined features include redefined property names, redefined property type and redefined multiplicity of a property.

12 Claims, 6 Drawing Sheets

OTHER PUBLICATIONS

Robak, S. et al., "Extending the UML for Modelling Variability for System Families," *Int. J. Appl. Math. Comput. Sci.*, 12(2): 285-298 (2002).

Szostak, S. et al., "UML Extensions for Modeling Real-Time and Embedded Systems," *The International Workshop on Discrete-Event System Design*, DESDes '01, Przytok, Poland, pp. 1-6 (Jun. 27-29, 2001).

D'Souza, D. et al., "First Class Extensibility for UML—Packaging of Profiles, Stereotypes, Patterns," In *UML '99—The Unified Modeling Language—Beyond the Standard*, Second International Conference, Fort Collins, Colorado, pp. 265-277 (Oct. 28-30, 1999).

Perez-Martinez, J.E., "Heavyweight extensions to the UML metamodel to describe the C3 architectural style," ACM SIGSOFT Software Engineering Notes, 28(3): 1-6, ACM Press (May 2003).

Selonen, P. and Xu, J., "Validating UML Models Against Architectural Profiles," *Proceedings of 9th European Software Engineering Conference/11th ACM SIGSOFT International Symposium on Foundations of Software Engineering '03*, Helsinki (ACM SIGSOFT Software Engineering Notes) 28(5): 58-67 (Sep. 1-5, 2003).

de Miguel, M. et al., "UML Extensions for the Specification and Evaluation of Latency Constraints in Architectural Models," *Proceedings of the Second International Workshop on Software and Performance* (ACM Press), Ottawa, Ontario, Canada, pp. 83-88 (2000).

Cortellessa, V. and Pompei, A., "Towards a UML profile for QoS: a contribution in the reliability domain," *Proceedings of the Fourth International Workshop on Software and Performance*, Redwood Shores, California (ACM SIGSOFT Software Engineering Notes) 29(1): 197-206 (Jan. 14-16, 2004).

Alhir, Sinan Si, "Extending the Unified Modeling Language (UML)," retrieved from: http://citeseer.ist.psu.edu/alhir99extending.html (Jan. 3, 1999).

Gogolla, Martin, et al., "Analysis of UML Stereotypes within the UML Metamodel," *UML 2002, LNCS 2460*, pp. 84-99 (2002).

Budinsky, F. et al., "Dynamic EMF," *Eclipse Modeling Framework—A Developer's Guide*, Addison-Wesley (2004), table of contents.

Merks, E., "The Eclipse Modeling Framework: Introducing Modeling to the Java™ Technology Mainstream," *JavaOne Sun's 2004 Worldwide Java Developer Conference*, slides 1-37 (2004).

OMG Document, "UML 2.0 Infrastructure Specification," Sep. 2003, Object Management Group, Inc., pp. 1-187.

"Unified Modeling Language: Superstructure," Version 2.0, Final Adopted Specification, pp. 569-584 (2003).

OMG Document, "Unified Modeling Language: Superstructure," Aug. 2003, Object Management Group, Inc., Version 2.0, pp. 1-609.

Budinsky, et al., "Eclipse Modeling Framework: A Developer's Guide," sections 5.7, 13.6; *Addison Wesley Professional* (Aug. 11, 2003).

Budinsky, et al., "Eclipse Modeling Framework: A Developer's Guide," sections 5.5, 8.2: *Addison Wesley Professional* (Aug. 11, 2003).

Unified Modeling Language: Infrastructure Version 2.0, $3^{rd}$ revised submission to OMG RFP ad/00-09-01, Jan. 6, 2003, Version 2.0, pp. 1-173.

Budinsky, F., et al., "Dynamic EMF," Eclipse Modeling Framework—A Developer's Guide, Addison-Welsey, pp. v-xiv, 34-35 (2004).

\* cited by examiner

COMPUTER METHOD AND APPARATUS FOR IMPLEMENTING REDEFINITION OF MODEL FEATURES

BACKGROUND OF THE INVENTION

With the proliferation of software products and services, attempts have been made to codify and/or standardize the designing of software and software architecture. Examples include:

The Booch Method and Modeling Language (see "Object Oriented Analysis and Design" by Grady Booch);

James Rumbaugh and associates' Object Modeling Technique (OMT);

the Object Oriented Software Engineering (OOSE) method by Ivar Jacobson; and the Unified Modeling Language (UML) which combines the foregoing and industry best practices.

The UML is a visual modeling language (with formal syntax and semantics) for communicating a model or conceptionalization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

In UML 2.0, properties and operations can be redefined (in the context of generalization) with, for example, a different type and/or multiplicity that is consistent with the original. The redefined property commonly has the same name as the property it is redefining, but this is not always the case. Redefinition is indicated using a redefines constraint, which is typically left out if the name remains the same.

The Rose model for UML 2.0 contains many properties whose names, types, and/or multiplicities have been redefined. There are, however, no known mechanisms for generating Java code that enforces these constraints. The Eclipse Modeling Framework (EMF) can be used to generate Java code from a Rose model, but provides no automated support for processing redefinitions.

One aspect of EMF (and of the Java language) that affects the treatment of redefined properties is the way multiple inheritance is handled. When processing a class that is defined to have more than one superclass, EMF will generate an interface that extends all of the interfaces corresponding to the specified superclasses, but the implementation class will extend only one of the implementation classes (since multiple inheritance is illegal in Java). The class that is extended by the implementation class is referred to as the class's primary superclass; all other superclasses are referred to as secondary, or mixin, superclasses.

Properties whose names are redefined do not pose a problem as far as EMF is concerned since it considers the redefined and redefining properties as separate properties. However, this means that the generated code will not indicate in any way that the redefining property in fact overrides the redefined property. It would be desirable for the generated code to in some way reflect the redefinition, and for the data in these properties to be serialized only once.

All other redefined aspects of properties pose problems to EMF. This is because properties with the same name are considered duplicates by EMF, and are factored out of the Ecore model (i.e., of the UML2 metamodel) during validation.

SUMMARY OF THE INVENTION

The present invention addresses the foregoing problems of the prior art.

In one embodiment, the present invention provides a computer method and apparatus for implementing (modeling) redefines constraints. A model element is provided and has a "redefined feature", i.e., a feature with a redefinition. The invention stores indications of the redefinition in a manner that makes a correspondence between the stored information and the model element. An interpreter interprets the stored indications/information and generates an implementation of the redefined feature.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
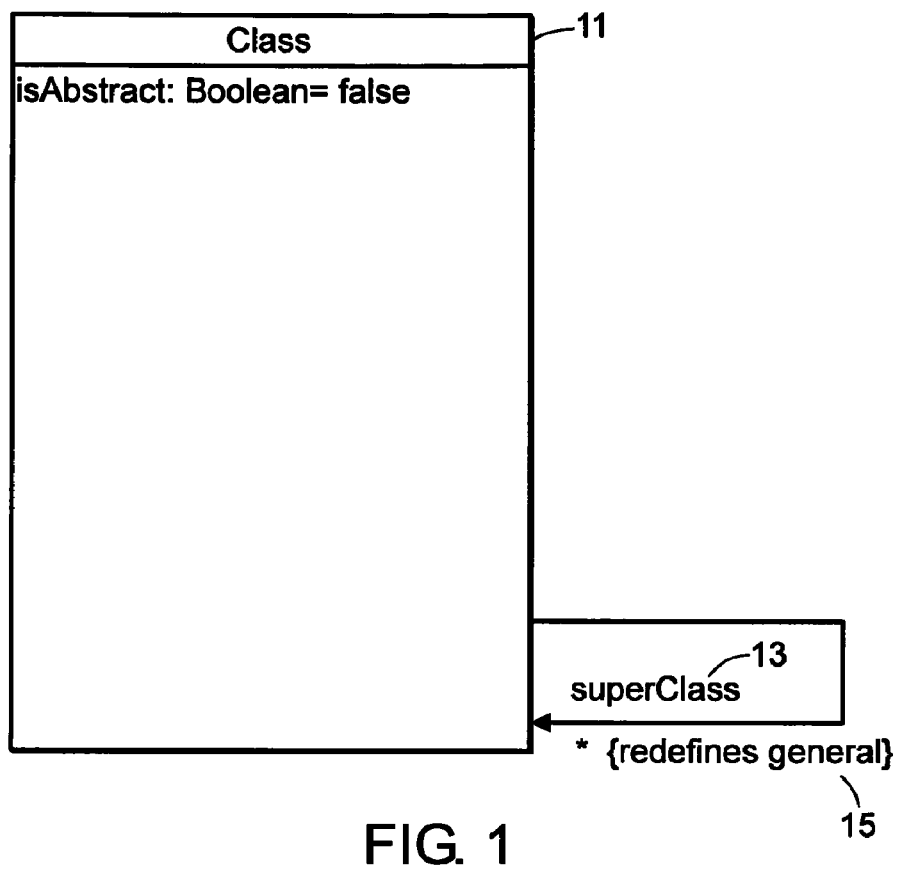
FIG. 1 is a schematic view of the "general" property of the Class class being redefined by the "superClass" property (i.e., a list property redefined by another list property).

There are two scenarios in which a property is considered a duplicate by EMF. The first scenario is where a class defines a property with the same name as a property already inherited from one of its superclass hierarchies. In this case, the Ecore "builder" (building the Ecore model or meta data of the user model) simply removes the attribute from the class. As a result, the generated interface and implementation class will contain neither a field nor accessors to represent the redefinition. It would be desirable for at least the getters and setters to be generated for these properties so that there is some indication in the generated code that these properties have been redefined.

The second scenario is where a class inherits two or more properties with the same name. In this case, EMF will discard the generalization relationships to the mixin classes whose hierarchies contain the second and subsequent properties. As a result, the generated interface and implementation class will neither extend nor implement the offending mixin class(es), and consequently will contain neither a field nor accessors to represent the redefinition. It would be desirable for the generalization relationship(s) to be retained for at least the getters and setters to be generated for these properties so that there is some indication in the generated code that these properties have been redefined.

Assume for a moment that EMF did not factor out duplicate properties as described above.

Properties whose types have been redefined would pose a number of problems, both from a Java and an EMF perspective. In EMF is not possible for a class to change the type of a feature that it inherits, and defining a new feature with the same name would lead to a whole host of problems. From a Java perspective, it is illegal for a field or method to be defined twice in the same hierarchy with a different type, so the resulting getters and setters would not compile anyway.

Properties whose multiplicities have been redefined would also pose a number of problems. Since EMF generates different code depending on a feature's multiplicity, two features with the same name but different multiplicities (e.g. 0 . . . * and 0 . . . 1) would result in incompatible code. As with type redefinition, the getters and setters for these features could have different types, and also would not compile.

The present invention overcomes the above limitations and provides a mechanism for generating Java code (in the preferred embodiment) or similar code that enforces redefines constraints in program modeling. In general, the present invention apparatus and method assists with building (designing) a model representation of a desired software product. Thus the present invention tool assists with forming the meta data design of the subject software product. The meta data design includes meta data classes, and instances thereof. Classes are defined with attributes, one of which is termed a "property". Properties are indicated in the model representation with a name and have a respective value (either defined in the model or derived at run time, for example). Properties also have a type and a multiplicity (number of program objects it relates or applies to). There are constraints on properties based on, for example, respective allowable range of values, unions of sets of values and the like. The redefines constraint of a given property provides a substitute name, type and/or multiplicity (among other characteristics) for the initial indicated property name, type and/or multiplicity. The redefines constraint effectively redirects or changes model processing to use the substitute name, type or multiplicity, etc.

Figure 9:
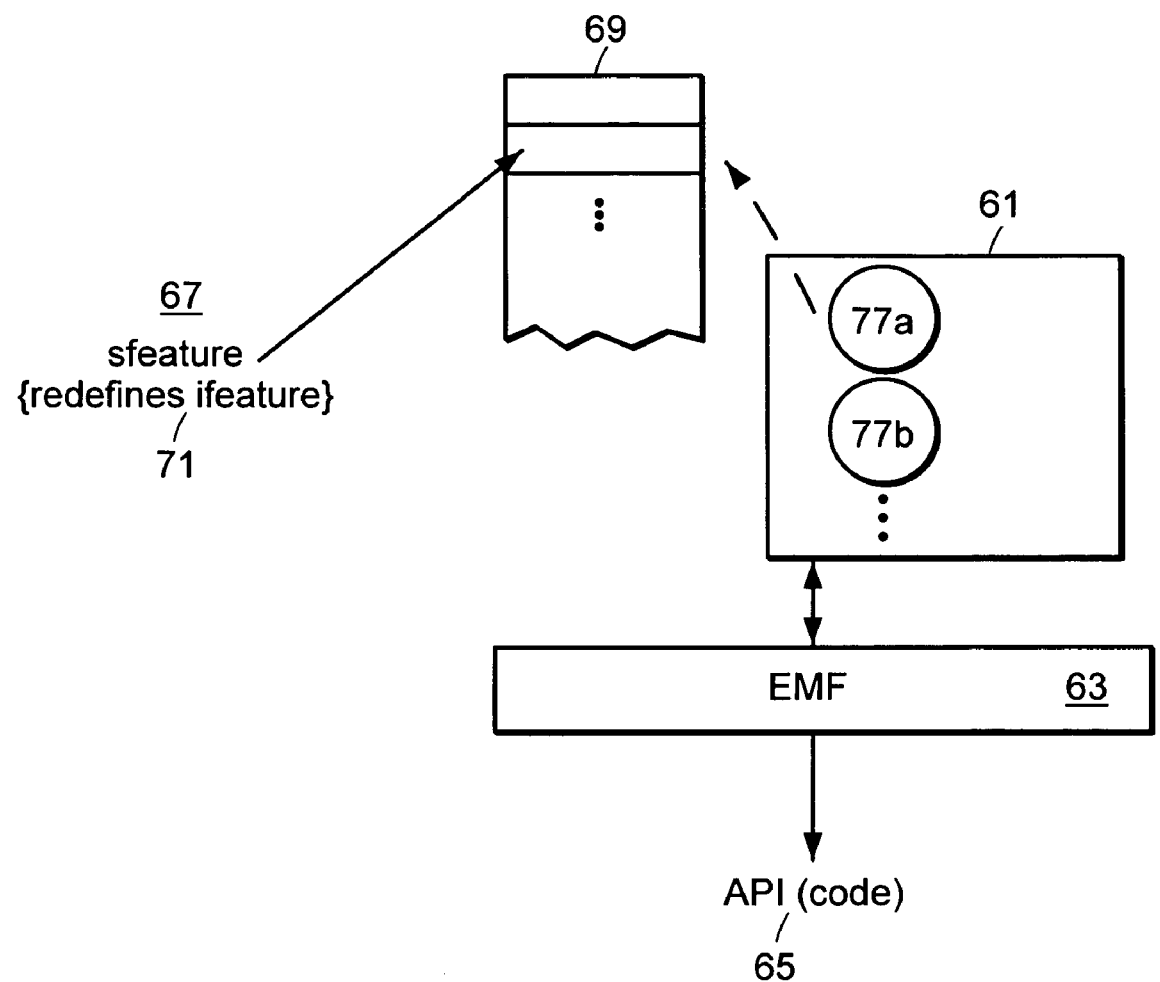
FIG. 9 is a block diagram of a preferred embodiment of the present invention.

FIG. 9 is illustrative. Shown is an example property "sfeature" 67 of a model element 77. The example property 67 has a redefines constraint (indicated between curly brackets). That is, the "sfeature" property (redefining) effectively substitutes or redefines the "ifeature" property 71 (initial one being redefined). For ease of discussion, the example redefines property constraint is generally referenced 67. The present invention records an indication of the redefines constraint 67 in annotations 69 corresponding to the model element 77. The annotations 69 may be stored in a list or other appropriate data structure. During model processing, the model interpreter 63 obtains the substituting definition (name, type and/or multiplicity) of "sfeature" in this example. Then in the body of the model program code 65, the model interpreter 63 reads the property being redefined ("ifeature" 71) and delegates processing to the substituting property ("sfeature" 67). The model interpreter 63 effectively overrides the model program code instructions to get the initially stated property ("ifeature" 71) and as a consequence returns program code that gets the substituting property ("sfeature" 67).

In a preferred embodiment, the subject user model 61 is a Rose model that represents the code generation (model) of interest, i.e., the software product model being designed. The present invention records (in the form of annotations 69 in respective parts of the Rose model 61) constraint information for each redefined property 67, 71. Next the preferred embodiment employs EMF to generate Java templates (or like code) from the annotated Rose model 61, 69. The generated Java template or the like carries out "get" instruction statements mentioned above and further discussed below. The resulting EMF 63 output is an API 65 (e.g., in an object oriented programming language) that correctly implements the Redefines constraint 67. Further specific examples are discussed below in FIGS. 1 through 5.

As described above, Java templates can be used to generate code for redefined features (properties 71) such that they delegate to their redefining features (properties) 67. There are several scenarios to consider with respect to redefined properties.

First, consider the case where a list property is redefined by another list property. For example, the "general" property 15 of the Class class 11 is redefined by its "superClass" property 13, as shown in FIG. 1.

Java or similar templates employed by the preferred embodiment generate target code for the getGeneral( ) operation on the ClassImpl class (created to override the implementation inherited from its parent) that resembles the following:

return getSuperClass( );

Next, consider the case where a non-list property is redefined by another non-list property. For example, the "owner" property 23 of the Vertex class 21 is redefined by its "container" property 25, as shown in the class diagram of FIG. 2.

Figure 2:
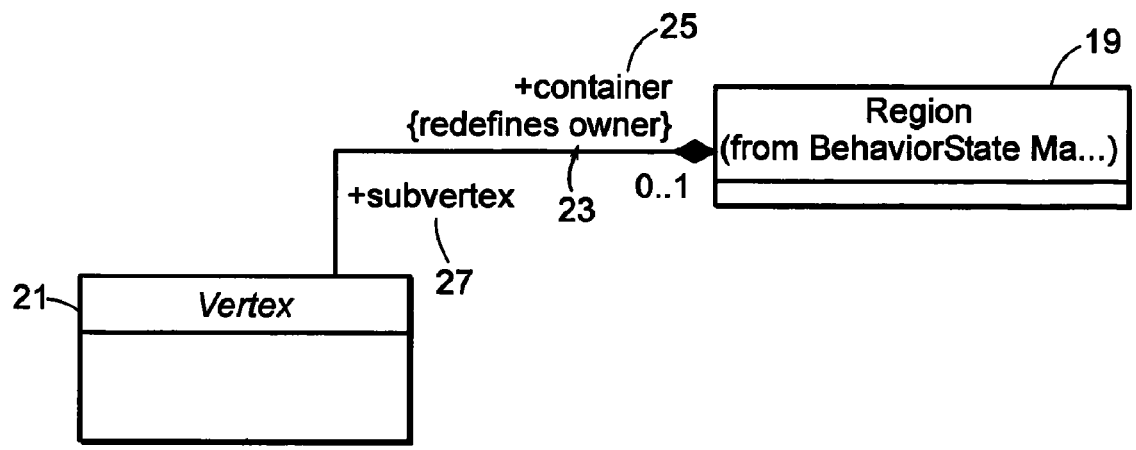
FIG. 2 is a schematic view of a non-list property ("owner") being redefined by another non-list property ("container").
Figure 4:
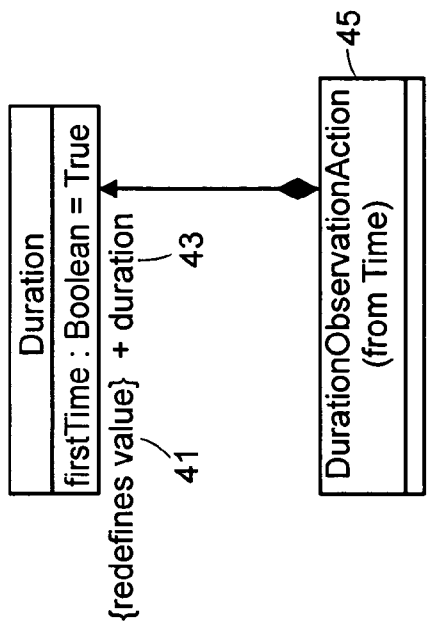
FIG. 4 is a schematic illustration of a non-list property ("value") being redefined by a list property ("duration").
Figure 5:
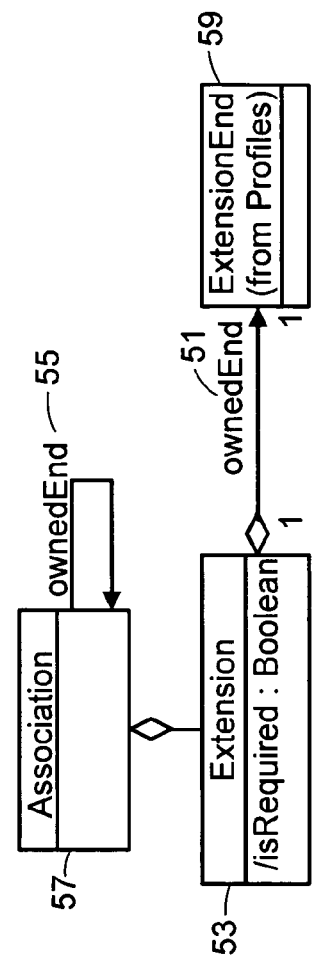
FIG. 5 is a block diagram of the redefining of an "ownEnd" property.
Figure 3:
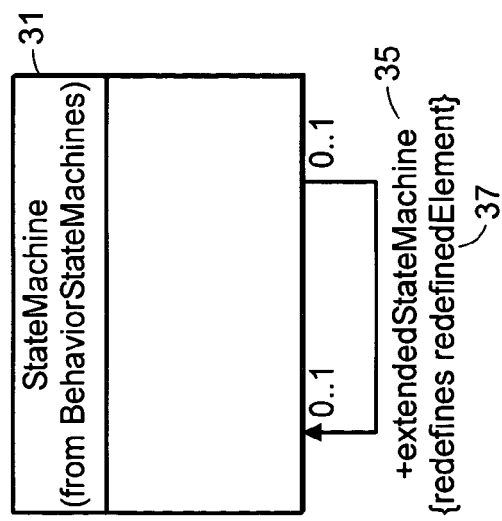
FIG. 3 is a schematic illustration of a list property ("redefinedElement") being redefined by a non-list property ("extendedStateMachine").

The Java or similar templates employed by the preferred embodiment generate target code for the getowner( ) operation on the VertexImpl class (created to override the implementation inherited from its parent) that resembles the following:

return (Element) getcontainer( );

Continuing with FIG. 2, the Region object 19 is an instance of the Vertex class 21 and inherits the "container" property 25 and the "subvertex" property 27 of class 21. Thus Region object 19 inherits the Redefines constraint of owner property 23 and container 25.

Next, consider the case where a list property is redefined by a non-list property. For example, the "redefinedElement" property 37 of the StateMachine class 31 is redefined by its "extendedStateMachine" property 35, as shown in the class diagram of FIG. 3.

The Java templates or similar model processing employed by the present invention generate code for the getRedefinedElement( ) operation on the StateMachineImpl class (created to override the implementation inherited from its parent) that resembles the following:

return new BasicEList.UnmodifiableEList (0, Collections.EMPTY_LIST.toArray( ));

Finally, consider the case where a non-list property is redefined by a list property. For example, the "value" property 41 of the DurationObservationAction class 45 is redefined by its "duration" property 43, as shown in the class diagram of FIG. 4.

The Java template in a preferred embodiment generates code for the getvalue( ) operation on the DurationObservationActionImpl class (created to override the implementation inherited from its parent) that resembles the following:

return null;

Target code is generated for the setValue( ) operation on the DurationObservationActionImpl class (created to override the implementation inherited from its parent) that resembles the following:

throw new UnsupportedOperationException( );

Next, target code for the redefining (substituting) features 67, described above, is implemented as follows. For example, the "ownedEnd" property 51 of the Extension class 53 redefines its ownedEnd property 55, inherited from the Association class 57, as shown in the class diagram of FIG. 5.

Target code in one embodiment is implemented for the getOwnedEnd( ) operation on the ExtensionImpl class (created to override the implementation inherited from its parent) that resembles the following:

```
if (ownedEnd == null) {
    ownedEnd =
        new EObjectContainmentWithInverseSubsetEList(
            ExtensionEnd.class,
            this,
            Uml2Package.EXTENSION_OWNED_END,
            new EObjectEList[] {(EObjectEList)
            getMemberEnd( )},
    Uml2Package.EXTENSION_END_OWNING_ASSOCIATION);
}
return ownedEnd;
```

Notice that the result achieved by the above redefinition is that the contents of the ownedEnd list feature 51 are further constrained to be of type ExtensionEnd 59.

Referring back to FIG. 9, when dealing with properties whose names have been redefined, the preferred embodiment records information about redefined properties 67, 71 as annotations 69 on the code generation model 61 that it builds as described above. At the model interpreter level 63, operations are created on the class that redefines the feature to override the accessors for the redefined feature 71 such that they delegate to the accessors for the redefining feature 69. This way, the values of these properties will not be stored in two places. Java templates are used to automatically generate code for these operations based on the annotations 69. The generated comments for the methods associated with these operations may (in some embodiments) indicate by which properties the properties represented by the operations have been redefined.

To deal with scenarios where a class defines a property with the same name as a property already inherited from one of its superclass hierarchies, the present invention model interpreter 63 converts the duplicate (in name) property into operations that represent the getters and setters that would have been generated if the properties were volatile. This results in an API 65 that is similar to that if the duplicate properties were not discarded.

To deal with scenarios where a class inherits two or more properties with the same name, the present invention model interpreter 63 renames the duplicate properties inherited from mixin classes so that they are not considered duplicates. The new name is unique, for example a concatenation of the class and original feature names. Operations are created in the mixin classes whose properties have been renamed so as to represent the accessors that would have been generated if the properties were not renamed. This way, the generalization relationships are preserved, and corresponding features are not discarded. Java templates automatically generate code for these operations based on annotations 69.

To deal with properties whose types have been redefined, the present invention model interpreter 63 changes the types of the two properties (if necessary) so that they are compatible. That is, the type for the two properties is set to the nearest common supertype of the two original types. One unfortunate side effect of this is that downcasting will be required to cast the types of the generated accessors to their original (intended) type.

To deal with properties whose multiplicities have been redefined, the present invention model interpreter 63 changes the multiplicities of the two properties (if necessary) so that they are compatible (unless the redefining feature is a container reference and the upper bound of the redefined feature is not 1). That is, the lower bound for the two properties is set to the lower of the two original lower bounds and the upper bound is set to the higher of the two original upper bounds. One unfortunate side effect of this is that the constraints will be relaxed, possibly resulting in a slightly different API 65 for the generated accessors. If the redefining property 67 is a container reference and the upper bound of the redefined feature 71 is not 1, it will instead be renamed with a unique name and treated as if it were a property with a name redefinition.

Figure 6:
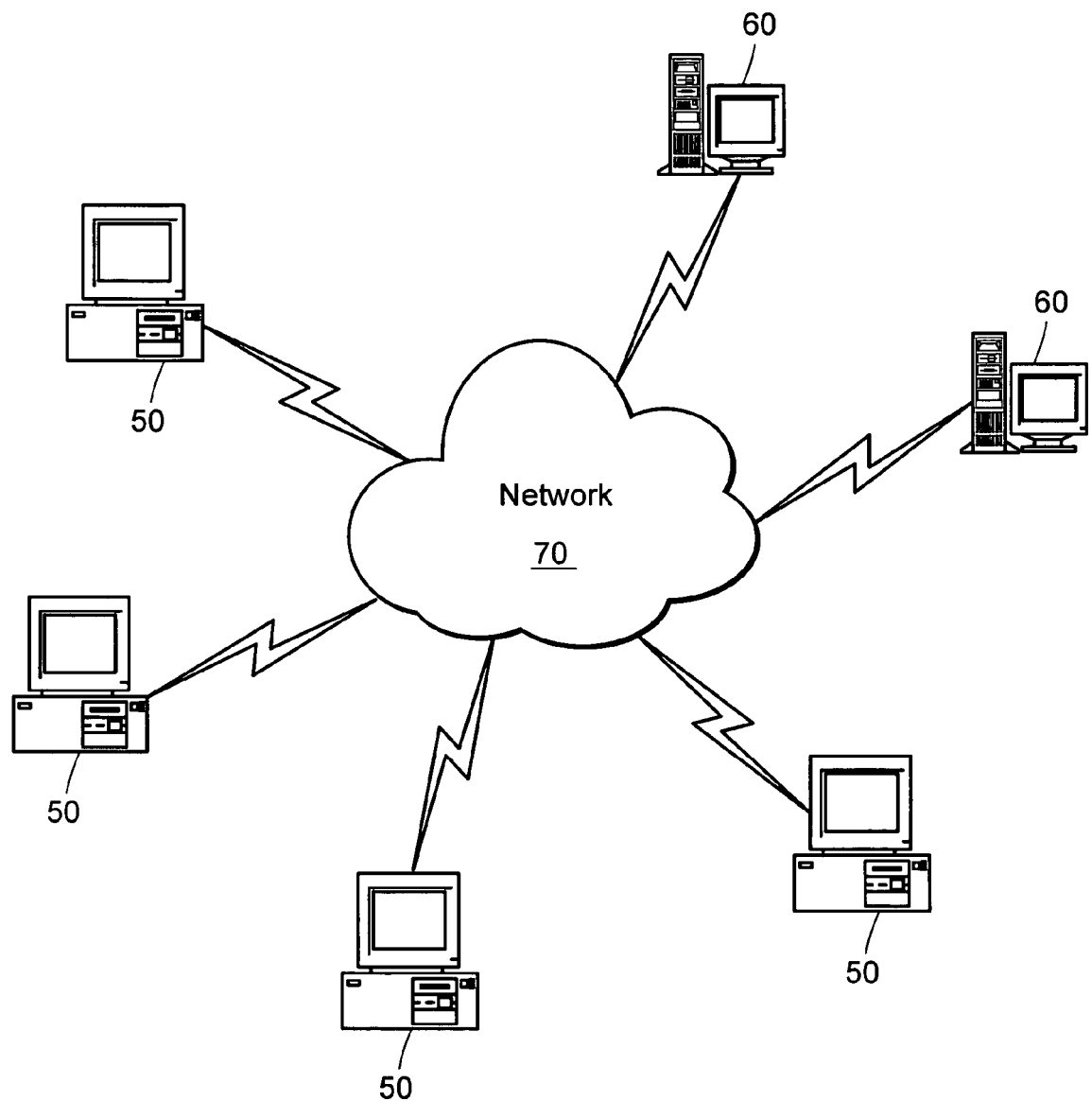
FIG. 6 is a schematic view of a computer environment in which the principles of the present invention may be implemented.

FIG. 6 illustrates an example computer environment in which the present invention operates. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the methods are implemented on a stand-alone computer. In either network or standalone, the invention output software design and models (API's 65) are sharable and reusable among users.

Figure 7:
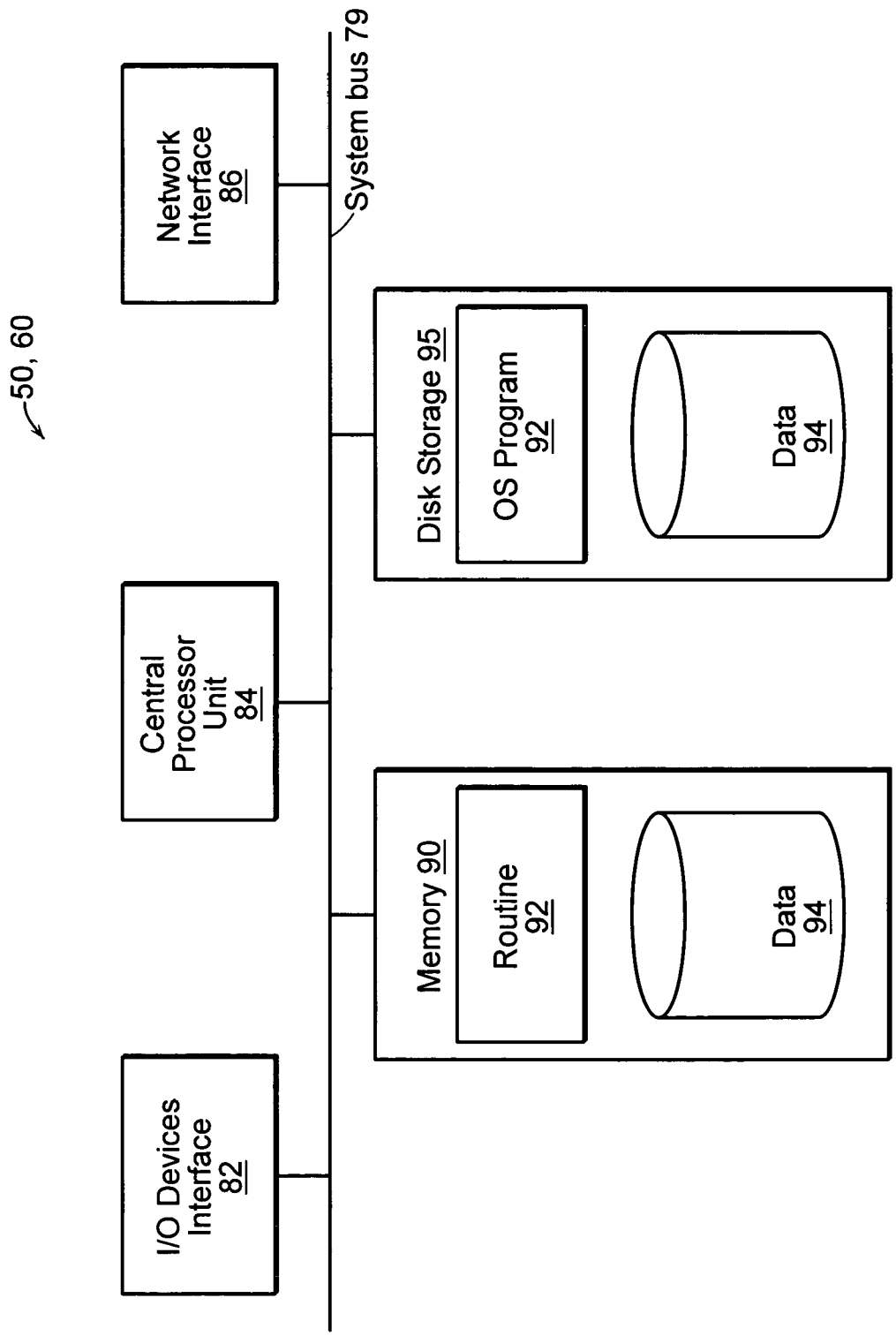
FIG. 7 is a block diagram of the internal structure of a computer from the FIG. 6 computer environment.

FIG. 7 is a diagram of the internal structure of a computer (e.g., client computer(s) 50 or server computers 60) in the computer system of FIG. 6. Each computer contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 6). Memory 90 provides volatile storage for computer software instructions used to implement an embodiment of the present invention (e.g., EMF code 63 and Rose models 61 of subject Program Routines 92 and Data 94).

Disk storage 95 provides non-volatile storage for computer software instructions and data used to implement an embodiment of the present invention. Central processor unit 84 is also attached to system bus 79 and provides for the execution of computer instructions.

Figure 8:
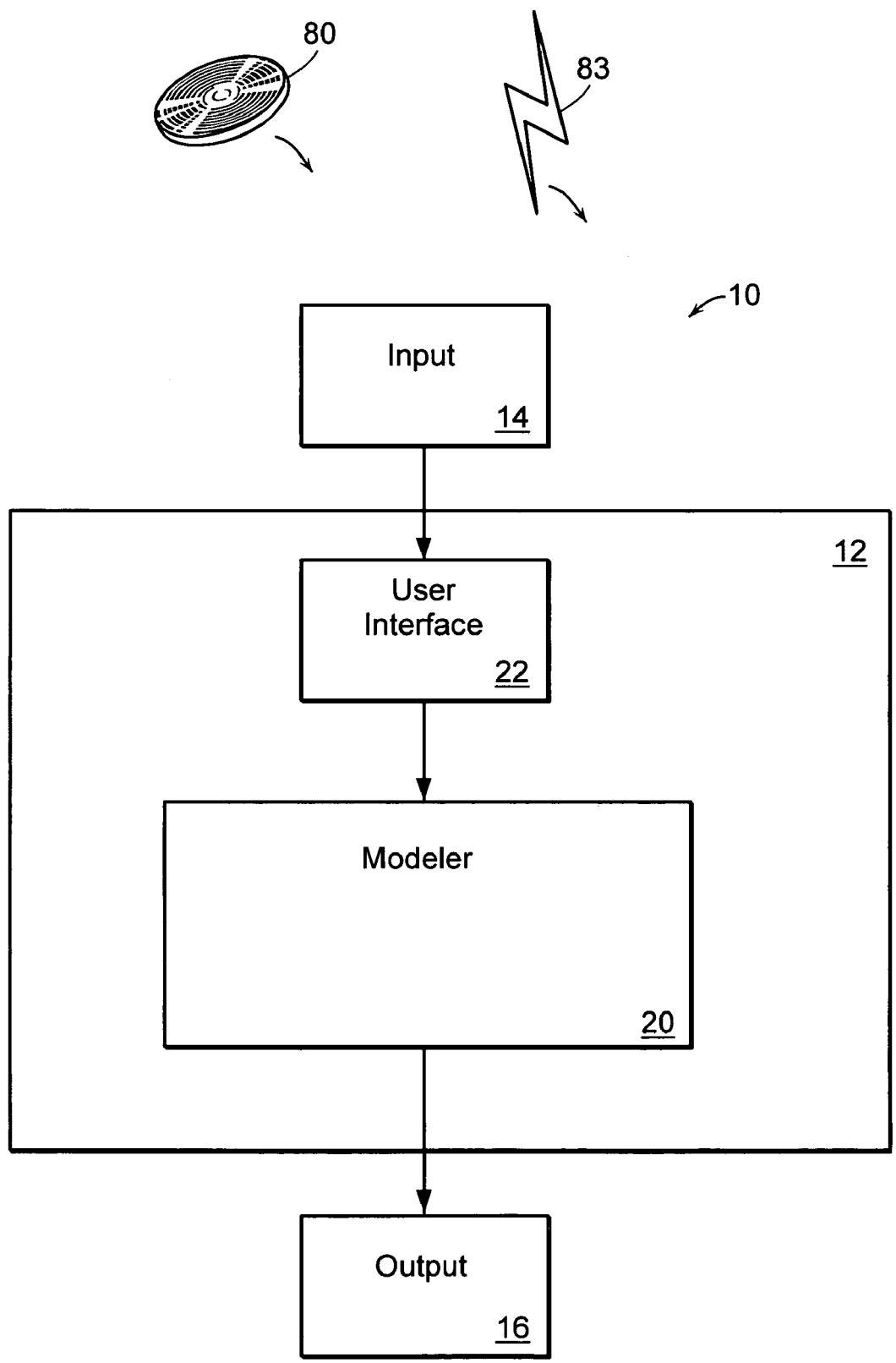
FIG. 8 is a schematic illustration of computer systems implementing methods of the present invention.

Referring now to FIG. 8 illustrated is another computer system 10 embodying the present invention techniques mentioned above. Generally, computer system 10 includes digital processor 12 in which subject modeling language and EMF code 20 are utilized. Input means 14 provides user commands, selections (generally communication) to computer system 10.

Responsive to input means 14 is user interface 22. User interface 22 receives user input data from input means 14 and provides input data for processing and manipulation at 20. The methods of the invention are implemented at 20 for designing Application Program Interfaces that enforce Redefines constraints in Java, UML, EMF and the like which are output at 16. Output 16 may be a display monitor, printer or other computer.

In one embodiment, computer program product 80, including a computer readable medium (e.g., a removable storage medium such as one or more DVD-ROM's, CD-ROM's, diskettes, tapes, etc.) provides at least a portion of the software instructions at 20 and/or user interface 22. Computer program product 80 can be installed by any suitable software installation procedure, as is well known in the art. In another embodiment, at least a portion of the software instructions may also be downloaded over a wireless connection. Computer program propagated signal product 83 embodied on a propagated signal on a propagation medium (e.g., a radio wave, an infrared wave, a laser wave, a sound wave, or an electrical wave propagated over a global network such as the Internet, or other network(s)) provides at least a portion of the software instructions at 20 and/or user interface 22.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 80 is a propagation medium that the computer system 10 may receive and read, such as by receiving the propagation medium and identifying a propagated signal embodied in the propagation medium, as described above for computer program propagated signal product 83.

Generally speaking, the term "carrier medium" or transient carrier encompasses the foregoing transient signals, propagated signals/medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the above recited example code is for purposes of illustration and not limitation. The model interpreter 63 may be implemented in UML, EMF and other modeling languages. The generated target/produced API code 65 may be Java, UML, EMF, XML, object oriented, and the like.

What is claimed is:

1. A computer method for implementing redefinition of features in a programming model, the programming model using a modeling language, the computer method comprising:

using the modeling language, defining metaclasses and having model elements as instances of metaclasses, model elements including properties having respective values, type and multiplicity;

providing a model element to the programming model, the model element having a property with a Unified Modeling Language (UML) redefinition, such that the property is a UML-type redefined feature;

storing semantic information representing the redefinition from the UML-type redefined feature in a manner corresponding to the model element, including recording UML redefines constraint information n the form of one or more annotations corresponding to the model element, resulting in a UML annotated element and thus an annotated programming model; and in an automated manner, interpreting the stored indications and generating therefrom from the annotated programming model an implementation of the UML-type redefined feature.

2. A method as claimed in claim 1 wherein the step of interpreting and generating employs EMF (Eclipse Modeling Framework).

3. A method as claimed in claim 1 wherein the step of generating generates JAVA code that implements the redefined feature.

4. A method as claimed in claim 1 wherein the UML-type redefined feature is one of a property name, property type or multiplicity of a property.

5. A computer program product for controlling a processor to implement modeling of redefined features in a programming model, comprising:

a computer useable storage medium having computer useable program code embodied therewith, the computer useable program code comprising:

computer useable program code configured to provide a model element having a feature with a Unified Modeling Language (UML) redefinition, such that there is a UML-type redefined feature;

computer useable program code configured to store semantic information representing the redefinition from the UML-type redefined feature in a manner corresponding to the model element, said storing including recording UML redefines constraint information in the form of an annotation corresponding to the model element, resulting in a UML annotated element and thus an annotated programming model; and computer useable program code configured to interpret the stored indications and generate from the annotated programming model a target code implementation of the UML-type redefined feature, in an automated manner.

6. A computer program product as claimed in claim 5 wherein the computer useable program code configured to interpret and generate employs EMF (Eclipse Modeling Framework).

7. A computer program product as claimed in claim 5 wherein the computer useable program code configured to generate target code generates JAVA code that implements the redefined feature.

8. A computer program product as claimed in claim 5 wherein the UML-type redefined feature is one of a property name, a property type, or multiplicity of a property of the model element.

9. A computer system for implementing in a target code redefines constraints in a programming model, the programming model using a modeling language, comprising:

modeling means for providing a model element having a Unified Modeling Language (UML) redefined property;

means for storing UML redefines constraints from the redefined property, wherein the means for storing records semantic information indicative of the UML redefines constraints in the form of an annotation corresponding to the model element, resulting in an annotated model; and an interpreter, in an automated manner, (i) interpreting the stored UML redefines constraints and (ii) from the annotated model generating target code that implements the UML redefines constraints.

10. A computer system as claimed in claim 9 wherein the modeling means includes a Rose model, and the interpreter employs EMF.

11. A computer system as claimed in claim 9 wherein the target code is JAVA.

12. A computer system as claimed in claim 9 wherein the redefined property includes redefinition of one of property name, property type or multiplicity.

\* \* \* \* \*